(12) United States Patent
Shimakura

(10) Patent No.: US 7,347,565 B2
(45) Date of Patent: Mar. 25, 2008

(54) DEVICE FOR MOUNTING AND DEMOUNTING OPTICAL ELEMENT

(75) Inventor: Takahiro Shimakura, Saitama (JP)

(73) Assignee: Fujinon Corporation, Saitama (JP)

( * ) Notice: Subject to any disclaimer, the term of this patent is extended or adjusted under 35 U.S.C. 154(b) by 345 days.

(21) Appl. No.: 11/151,350

(22) Filed: Jun. 14, 2005

(65) Prior Publication Data

US 2005/0276591 A1    Dec. 15, 2005

(30) Foreign Application Priority Data

Jun. 14, 2004  (JP)  ............................. 2004-175652

(51) Int. Cl.
  *G03B 17/00*   (2006.01)
  *G03B 19/12*   (2006.01)
(52) U.S. Cl. .................... 353/73; 396/355; 348/360
(58) Field of Classification Search .................. 396/73, 396/71, 74, 355, 380, 381, 429, 435, 439, 396/530, 544; 348/335, 360
See application file for complete search history.

(56) References Cited

U.S. PATENT DOCUMENTS 4,038,671 A * 7/1977 Schroder et al. .............. 396/73
4,681,418 A * 7/1987 Kodaira ........................ 396/73
5,751,353 A * 5/1998 Tanaka et al. ............... 348/335
5,765,049 A * 6/1998 Hase et al. .................... 396/73
6,226,460 B1 * 5/2001 Hino et al. .................... 396/73

FOREIGN PATENT DOCUMENTS

| JP | 9-133958    | 5/1997 |
| JP | 9-171135    | 6/1997 |
| JP | 2001-133870 | 5/2001 |

* cited by examiner

*Primary Examiner*—Rochelle Blackman
(74) *Attorney, Agent, or Firm*—Young & Thompson

(57) ABSTRACT

An optical element mounting and demounting device for bringing an optical element (26) into an optical path of an optical lens system and removing it from the optical path includes a holder frame (28) for holding the optical element (26) that is supported for pivotal movement on a stationary shaft (30) so as to move the optical element (26) between a rest position and a working position, an urging member (40, 50, 60) for applying urging force against the holder frame during pivotal movement of the holder frame (28) between the rest position and the working position, the urging member being secured to a stationary member so as to invert the direction of urging force against the holder frame between the rest position and the working position, and a manually operable member elements for causing pivotal movement of the holder frame between the rest position and the working position.

5 Claims, 4 Drawing Sheets

DEVICE FOR MOUNTING AND DEMOUNTING OPTICAL ELEMENT

BACKGROUND OF THE INVENTION

1. Field of the Invention

The present invention relates to a device for mounting and demounting an optical element, and more specifically, for inserting an optical element into an optical lens system, such as an image forming lens system of, in particular, a broadcasting television camera and removing the same from the optical lens system.

2. Description of Related Art

It is required so often for broadcasting television cameras such as electronic news gathering cameras (ENG cameras) to provide magnified images. An image forming lens system, namely a taking lens system, for such an ENG camera is provided with an optical element switch device for inserting an optical element such as a converter or extender lens into an optical path of the taking lens system for altering the focal length of the taking lens system and removing the optical element from the taking lens system. One of extender switching devices that is disclosed in, for example, Japanese Unexamined Patent Publication No. 9-171135 includes first and second extenders pivotally mounted on a common pivot shaft so as to be moves between a working position and rest positions independently through operation of a manual operation lever. The extender switching device is provided with urging means such as a tension spring for retaining an extender lens in a stationary state in a predetermined position and a damper mechanism for preventing generation of hitting sound and/or vibrations when the extender lens is moved from the rest position to the working position or vice versa.

However, the extender switching device disclosed in the publication needs a number of constituent parts for the retainer spring and the damper mechanism and increases the number of man-hour for fabrication in consequence.

SUMMARY OF THE INVENTION

It is therefore an object of the present invention to provide a device for moving an optical element between a working position in an optical axis of a lens system and a rest position out of the optical axis of the lens system that is simple in structure and is smoothly operative.

The foregoing object is accomplished by an optical element switch device for bringing an optical element such as, for example, am extender lens, a ratio converter lens, or an optical filter for transmitting light according to wavelengths, into an optical path of an image forming lens system and removing it from the optical path that comprises a holder frame for fixedly holding the optical element which is movable between a rest position in which the optical element is put out of the optical path of the image forming lens system and a working position in which the optical element is put in the optical path of the image forming lens system, operating means for causing movement of the holder frame between the rest position and the working position, and urging means in the form of a leaf spring fixedly supported on a stationary part such as a housing of the device for applying urging force against the holder frame during movement of the holder frame between the rest position and the working position and inverting the urging force in direction with respect to the holder frame between the rest position and the working position.

According to the optical element switch device of the present invention, the urging means keeps itself applying urging force against the holder frame in a direction of movement and reverses directions of urging force with respect to the holder frame between the rest position and the working position. In consequence, the holder frame, and hence the optical element held by the holder frame, is firmly retained in an intended position, either the rest position or the working position, and prevented from generating hitting noises when reaching the rest position or the working position and causing cranky movement between the rest position and the working position. The directional inversion of urging force is distinctly recognizable, so that the optical element switch device is improved in operationality. Furthermore, the optical element switch device of the present invention eliminates installation of a tension spring and a damper mechanism and, in consequence, is simple in structure.

The urging means may comprise a leaf spring that is secured at one or both of opposite ends thereof to the stationary part, for example the housing, of the optical element switch device so as to be elastically bendable or deformable during movement of the holder frame between the rest position and the working position. In more detail, the leaf spring secured at one end thereof has a generally V-shaped form so that the leaf spring allows another end section to be bent by a projection or a rim of the holder frame. The leaf spring secured at both one ends thereof comprises bent and straight sections so that the leaf spring allows itself to be deformed by a rim of the holder frame.

The optical element switch device is especially suitably embodied as an extender switch device for inserting an extender lens into an optical lens system of, for example, a broadcasting television camera such as an electronic news gathering camera and removing the same from the optical lens system.

BRIEF DESCRIPTION OF THE DRAWINGS

The foregoing and other objects and features of the present invention will be clearly understood from the following detailed description when reading with reference to the accompanying drawings, wherein the same reference signs have been used to denote same or similar parts throughout the drawings, and in which.

DETAILED DESCRIPTION OF THE PREFERRED EMBODIMENTS

Figure 1:
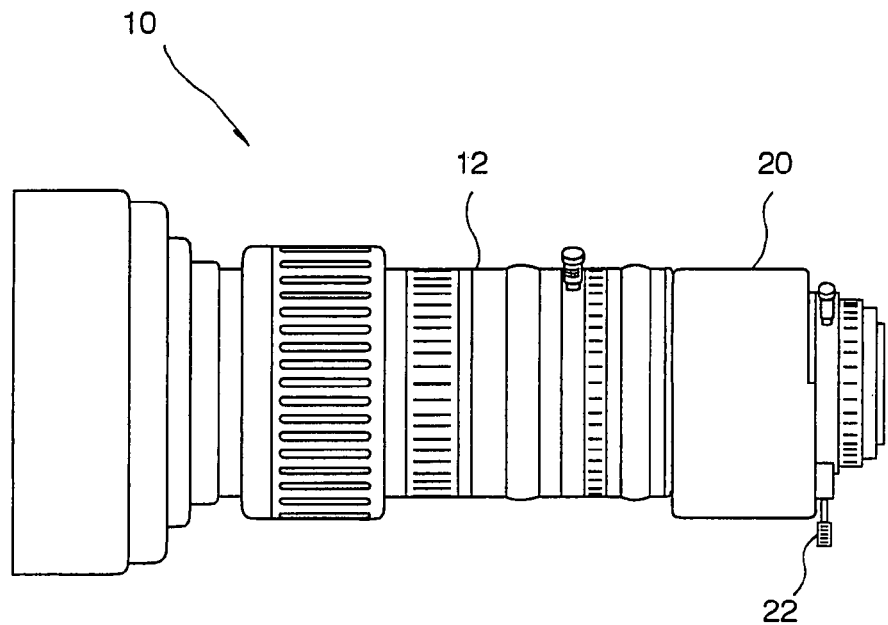
FIG. 1 is an external plane view of a zoom lens for an electronic news gathering camera which is equipped with an extender switch device according to an embodiment of the present invention.
Figure 2:
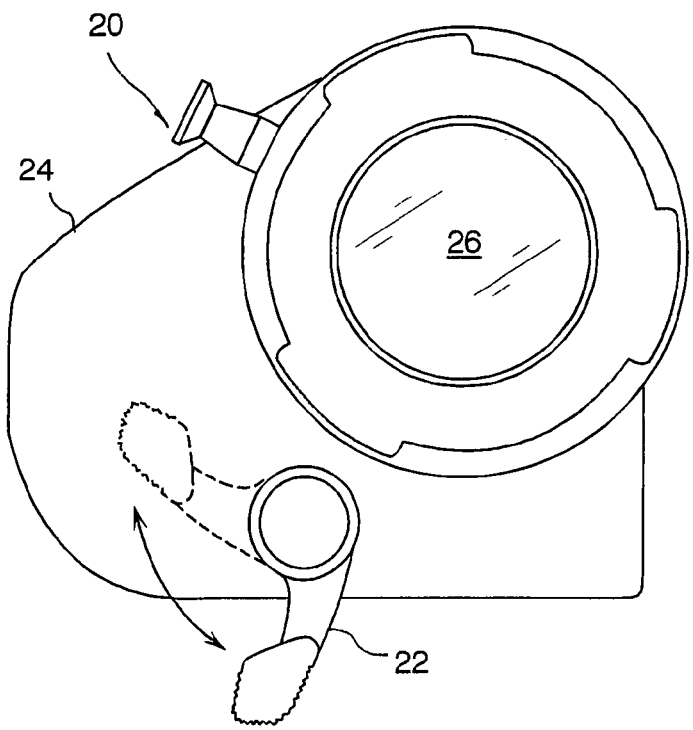
FIG. 2 is a rear view of the extender switch device.

Referring to the accompanying drawings in detail, and in particular, to FIGS. 1 and 2 showing a zoom lens 10 that is capable of being detachably mounted to portable TV cameras such as electronic news gathering (ENG) cameras (not shown), the zoom lens 10 comprises a zoom lens part 12 and an extender part 20 having a switch lever 22 for manually switching an extender lens between working and rest positions. Zoom lenses generally comprise at least a focusing lens system and a zooming lens system arranged in order from the object side to the image side. Such a zoom lens is known in various types and takes any type well known in the art. Details of the zoom lens will not be set out in detail since their construction and operation can be easily arrived at by those skilled in the art.

As shown in FIG. 2, the extender part 20 includes a housing 24 in which an extender lens 26 and a switch lever 22 are incorporated. The switch lever 22 is manually operated to switch the extender lens 26 between a rest position (see FIG. 3) in which an extender lens 26 is out of the zoom lens system and a working position (see FIG. 4) in which the extender lens 26 is put in the zoom lens system through a switching mechanism which will be described later.

Figure 3:
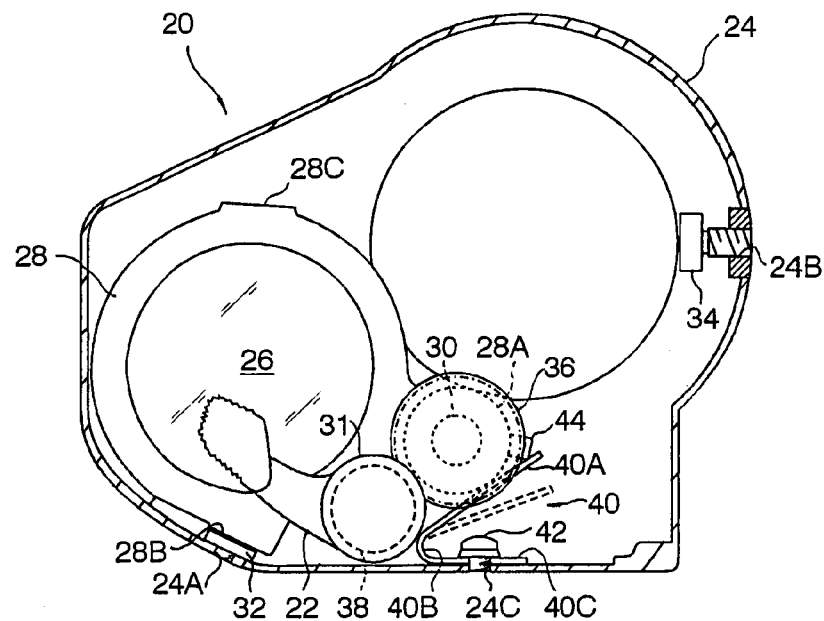
FIG. 3 is a rear view of an interior structure of the extender switch device which is in a rest position.
Figure 4:
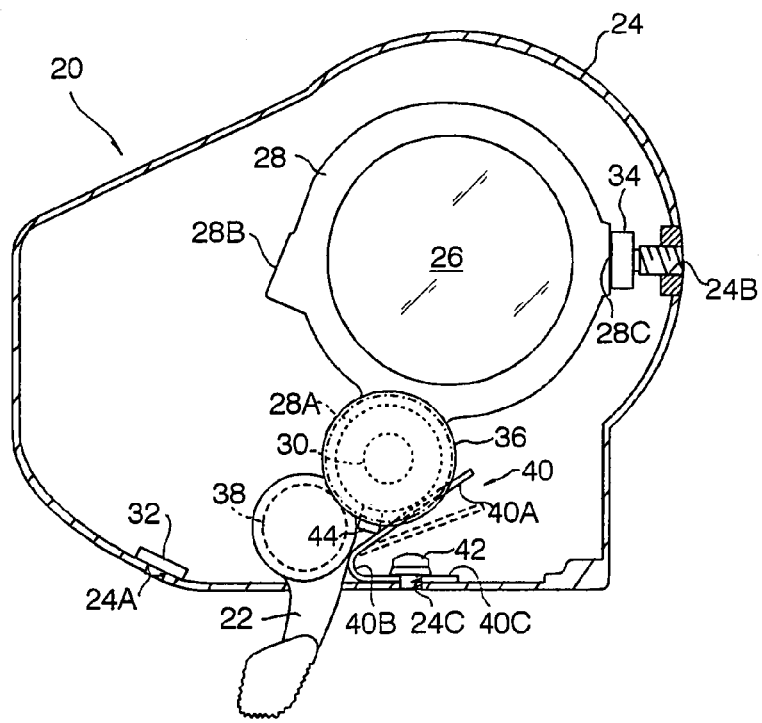
FIG. 4 is a rear view of an interior structure of the extender switch device which is in a working position.

FIGS. 3 and 4 show details of the switching mechanism for switching the extender lens 26 between the rest position and the working position, respectively. The extender lens 26, which has a magnifying power of, for example X 2 and may consists of single or a plurality of lenses, is fixedly held in a holder frame 28 having a hub ring 28A through which the holder frame 20 is pivotally mounted on a pivot shaft 30 fixed to the housing 24. The holder frame 28 has circumferential locating faces 28B and 28C disposed at substantially diametrically opposite positions thereof. The locating face 28B is brought into abutment with a stopper stud 32 fitted in a threaded hole 24A formed in the housing 24 so as to retain the holder frame 28 in the rest position shown in FIG. 3 when the extender lens 26 is moved out of the zoom lens system. The locating face 28C is brought into abutment with a stopper stud 34 fitted in a threaded hole 24B formed in the housing 24 so as to position the holder frame 28 in the working position shown in FIG. 4 when the extender lens 26 is moved into the zoom lens system. These stopper studs 28B and 28C can be adjusted in threaded position for fine adjustment of the rest position and the working position, respectively. The switch lever 22 has a shaft 31 having an external gear 38 integrally formed therewith and pivotally mounted to the housing 24. On the other hand, the hub ring 28A of the holder frame 28 has an external gear 36 and a projection 44 integrally formed therewith. The switch lever 22 and the holder frame 28 are operationally coupled to each other through engagement between the external gears 36 and 38.

The switching mechanism includes urging means comprising, for example in this embodiment, a generally V-shaped leaf spring 40 for preventing the holder frame 28 from generating hitting noises when the holder frame 28 hits the stopper studs 28B and 34 and causing cranky movement between the rest position and the working position. The V-shaped leaf spring 40 is made from a steel strip having a predetermined width and comprises a pressure arm section 40A, a base section 40C and a bent section 40B by which the pressure arm section 40A and the base section 40C are connected as an integral piece. The leaf spring 40 is fixed to the housing 24 by a fixing stud 42 fitted in a threaded hole 24C formed in the housing 24. The pressure arm section 40A cooperates with the projection 44 of the hub ring 28A of the holder frame 28 so as to urges the holder frame 28. More specifically, when operating the switch lever 22, the holder frame 28 is turned through engagement between the external gear 36 of the hub ring 28A and the external gear 38 of the shaft 31 of the switch lever 22. During movement of the holder frame 28 from the rest position to the working position and vice versa, the leaf spring 40 is elastically bent downward by the projection 44 as depicted by a broken line so as thereby to keep itself applying urging force against the projection 44 of the holder frame 28. When the holder frame 28 is put in the rest position shown in FIG. 3, the leaf spring 40 urges the projection in a counterclockwise direction so as thereby to retain the holder frame 28 in the rest position. Similarly, when the holder frame 28 is put in the working position shown in FIG. 4, the leaf spring 40 urges the projection in a clockwise direction so as thereby to retain the holder frame 28 in the working position. In this manner, urging force against the holder frame 28 is inverted in direction according to the moved positions, namely the rest position and the working position, of the holder frame 28.

In operation of the extender switching device thus structured, while the extender lens 26 is in the rest position as shown in FIG. 3, the holder frame 28 is retained with the circumferential locating face 28B abutted against the stopper stud 32 due to urging force applied against the projection 44 of the hub ring 28A of the holder frame 28 in a counterclockwise direction by the leaf spring 40. When operating the switch lever 22 in a counterclockwise direction, the holder frame 28 is moved in a counterclockwise direction through engagement between the external gear 36 of the hub ring 28A and the external gear 38 of the shaft 31 of the switch lever 22 so as thereby to put the extender lens 26 into an optical path of the zoom lens system as shown in FIG. 4. As a result, when the locating face 28C is brought into abutment with the stopper stud 34, the extender lens 26 is stationarily put in the optical axis of the zoom lens, and the holder frame 28 is retained in the working position by the leaf spring 40 shown in FIG. 4. On the other hand, when operating the switch lever 22 in a clockwise direction when the extender lens 26 is in the optical path of the zoom lens system, the holder frame 28 is moved in a clockwise direction through engagement between the external gear 36 of the hub ring 28A and the external gear 38 of the shaft 31 of the switch lever 22 so as thereby to remove the extender lens 26 out of the optical path of the zoom lens system as shown in FIG. 3. As a result, when the locating face 28B is brought into abutment with the stopper stud 32, the extender lens 26 is completely removed out of the optical axis of the zoom lens, and the holder frame 28 is retained in the rest position by the leaf spring 40 shown in FIG. 4.

The urging force applied against the projection 44 of the hub ring 28A of the holder frame 28 is inverted before and after an intermediate point of the movement of the holder frame 28 from the rest position to the working position and the vice versa. While it is necessary to operate the switch lever 22 with excess force in order to cause the holder frame 28 to pass through the intermediate point of the movement against the leaf spring 40, operation of the switch lever 22 becomes easy after the intermediate point of the movement because the leaf spring 40 applies urging force to the holder frame 28 in the same direction as movement of the holder frame 28. In consequence, an inversion point of urging force is distinctly recognizable, and operationality of the switch lever 22 is improved. Furthermore, because the holder frame 28 is always urged by the leaf spring 40 during movement from the rest position to the working position and the vice versa, the holder frame 28 is prevented from dashing against the stopper stud 32 or 34 with the locating surface 28B or 28C, respectively, and hence, from generating hitting noises when the holder frame 28 reaches the rest position or the working position, besides prevented from causing cranky movement between the rest position and the working position.

Figure 5:
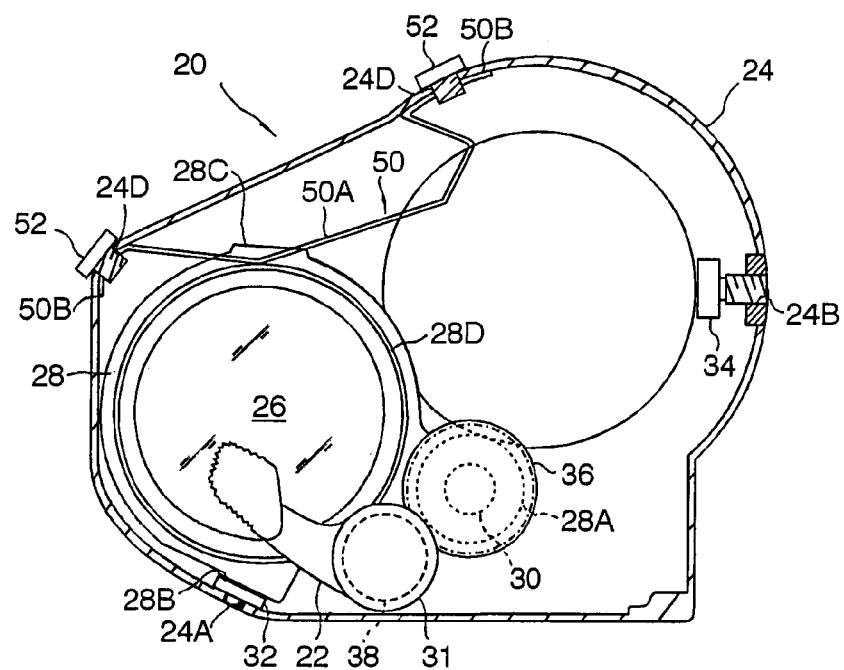
FIG. 5 is a rear view of an interior structure of an extender switch device according to another embodiment of the present invention which is in a rest position.
Figure 6:
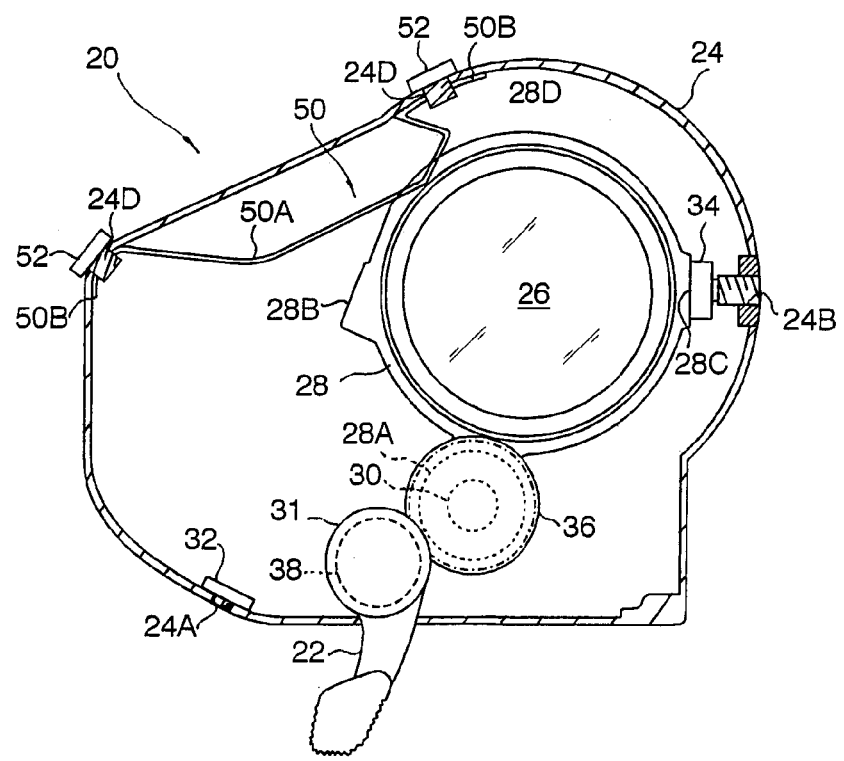
FIG. 6 is a rear view of an interior structure of the extender switch device which is in a working position.

FIGS. 5 and 6 show an extender switching device 20 according to another embodiment of the present invention in which alternative urging means is employed. As shown, the urging means for preventing the holder frame 28 mounting an extender lens 26 therein from generating hitting noises and causing cranky movement comprises an integral piece of leaf spring 50. The leaf spring 50 is made from a steel strip having a predetermined width and has a generally U-shaped sections 50A between opposite end legs 50B. The generally U-shaped section 50A comprises a plurality of straight segments joined together at certain angles as an integral piece. The leaf spring 50 at the end legs 50B is fixed to the housing 24 by fixing studs 52 fitted in threaded holes 24D formed in the housing 24 so as to allow the U-shaped sections 50A to be elastically flatly deformable with external force. The holder frame 28 has a rim 28D formed on a rear surface thereof against which the leaf spring 50 is forced.

The leaf spring 50 keeps itself pushing the rim 28D of the holder frame 28 in a circumferential direction with the while the holder frame 28 is moved between a rest position shown in FIG. 5 and a working position shown in FIG. 6. More specifically, the leaf spring 50 is deformed when the holder frame 28 moves between the rest position and the working position so that the urging force applied against the rim 28D of the holder frame 28 is inverted before and after an in-between position between the rest position and the working position. As a result, the holder frame 28 is urged in a counterclockwise direction while the holder frame is in the rest position and, on the other hand, in a clockwise direction while the holder frame 28 is in the working position.

While the extender lens 26 is out of the zoom lens system, the holder frame 28 is urged by the U-shaped section 50A of the leaf spring 50 so as to be retained in the rest position through abutment of the locating face 28B against the stopper stud 32. When operating the switch lever 22 so as to move the extender lens 26 into the zoom lens, the locating face 28C of the holder frame 28 is brought into abutment against the stopper stud 34, so as to retain the holder frame 28 in the working position. Because the holder frame 28 is always urged by the leaf spring 50 during movement from the rest position to the working position and the vice versa, the holder frame 28 is prevented from dashing against the stopper stud 32 or 34 with the locating surface 28B or 28C, respectively, and hence, from generating hitting noises when the holder frame 28 reaches the rest position or the working position, besides prevented from causing cranky movement between the rest position and the working position.

Figure 7:
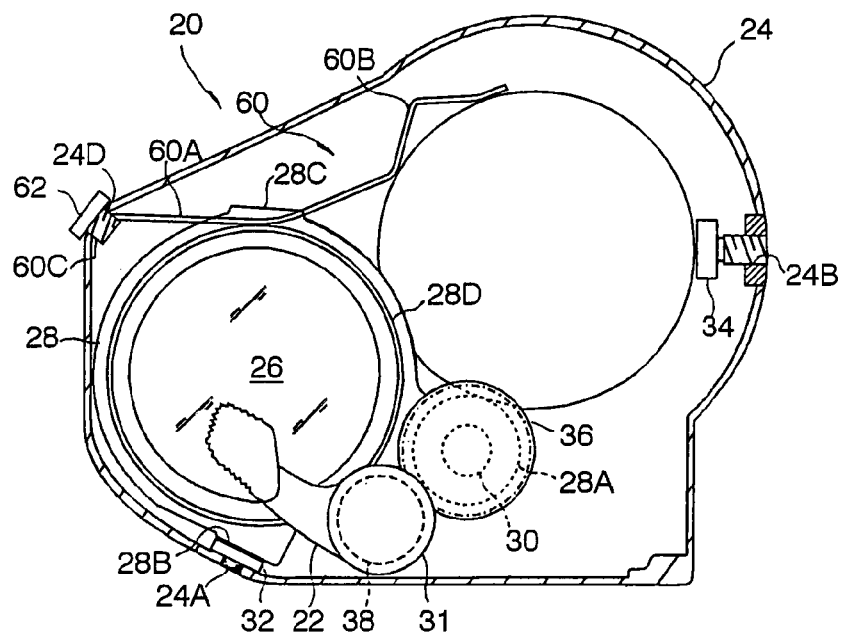
FIG. 7 is a rear view of an interior structure of an extender switch device according to a further embodiment of the present invention which is in a rest position.
Figure 8:
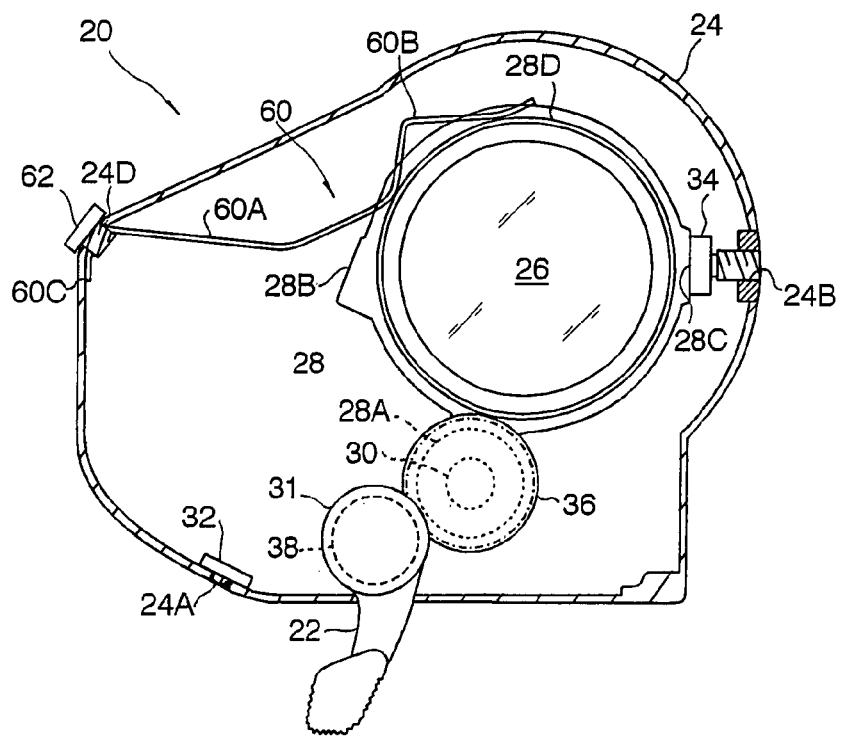
FIG. 8 is a rear view of an interior structure of the extender switch device which is in a working position.

FIGS. 7 and 8 show an extender switching device 20 according to a further embodiment of the present invention in which alternative urging means is employed. As shown, the urging means for preventing the holder frame 28 mounting an extender lens 26 therein from generating hitting noises and causing cranky movement comprises a cantilever type of leaf spring 60. The leaf spring 60, that is made from a steel strip having a predetermined width, has a generally V-shaped distal sections 60A and 60B directed inversely to each other and is fixed at an end leg 60C to the housing 24 by a fixing stud 62 fitted in a threaded hole 24D formed in the housing 24 so as to allow the V-shaped sections 60A and 60B to be elastically bendable with external force. The holder frame 28 has a rim 28D formed on a rear surface thereof against which the leaf spring 60 is forced.

The leaf spring 60 keeps itself pushing the rim 28D of the holder frame 28 in a circumferential direction with the V-shaped sections 60A or 60B while the holder frame 28 is moved between a rest position shown in FIG. 5 and a working position shown in FIG. 6. More specifically, the leaf spring 50 is deformed when the holder frame 28 moves between the rest position and the working position so that the urging force applied against the rim 28D of the holder frame 28 is inverted before and after an in-between position between the rest position and the working position. As a result, the holder frame 28 is urged in a counterclockwise direction while the holder frame is in the rest position and, on the other hand, in a clockwise direction while the holder frame 28 is in the working position.

While the extender lens 26 is out of the zoom lens system, the holder frame 28 is urged in a counterclockwise direction by the V-shaped section 60A so as to be retained in the rest position through abutment of the locating face 28B against the stopper stud 32. When operating the switch lever 22 so as to move the extender lens 26 into the zoom lens, the holder frame 28 elastically bends the leaf spring 60 and brings the rim 28D into engagement with the V-shaped section 60B. Then, when the locating face 28C of the holder frame 28 is brought into abutment against the stopper stud 34, the leaf spring 60 urges the holder frame 28 in a clockwise direction by the V-shaped section 60B so as thereby to retain the holder frame 28 in the working position. In this manner, urging force against the holder frame 28 is inverted in direction at a point of movement of the holder frame 28 where engagement of the leaf spring 60 with holder frame 28 changes from the V-shaped section 60A to the V-shaped section 60B. Also in this embodiment, because the holder frame 28 is always urged by the leaf spring 60 during movement from the rest position to the working position and the vice versa, the holder frame 28 is prevented from dashing against the stopper stud 32 or 34 with the locating surface 28B or 28C, respectively, and hence, from generating hitting noises when the holder frame 28 reaches the rest position or the working position, besides prevented from causing cranky movement between the rest position and the working position.

Although the optical element switch device of the present invention has been described as to the extender switch device embodied in a zoom lens for an ENG camera by way of example, the optical element switch device may be incorporated in various types of image forming optical lens systems.

It is to be understood that although the present invention has been described with regard to a preferred embodiments thereof, various other embodiments and variants may occur to those skilled in the art, which are within the scope and spirit of the invention, and such other embodiments and variants are intended to be covered by the following claims.

What is claimed is:

1. An optical element switch device for bringing an optical element into an optical path of an image forming lens system and removing it from the optical path, said optical switch device comprising:

a holder frame for holding said optical element, said holder frame being supported for pivotal movement on a stationary member of the optical element switch device so as to move said optical element between a rest position in which said optical element is put out of said optical path of said image forming lens system and a working position in which said optical element is put in said optical path of said image forming lens system;

manually operable switch means for causing pivotal movement of said holder frame between said rest position and said working position; and a spring in sliding contact with an outer peripheral portion of said holder frame and applying urging force against said holder frame during pivotal movement of said holder frame between said rest position and said working position, said spring being secured to said stationary member of the optical element switch device and inverting said urging force in direction with respect to said holder frame between said rest position and said working position, said outer peripheral portion of said holder frame sliding along said spring during movement of said holder frame between said rest position and said working position, said spring comprising a leaf spring secured at opposite ends to said stationary member and having bent and straight sections so as to be elastically deformable in shape during movement of said holder frame between said rest position and said working position.

2. The optical element switch device as defined in claim 1, wherein said holder frame has at least one projection against which said spring applies said urging force.

3. The optical element switch device as defined in claim 1, wherein said optical element comprises an extender lens for altering a focal length of said image forming lens system.

4. The optical element switch device as defined in claim 1, wherein said spring comprises an elongated leaf spring, and said outer peripheral portion of said holder frame slides along a portion of the length of said leaf spring between said rest position and said working position.

5. The optical element switch device as defined in claim 1, wherein said manually operated switch means is a swingable lever having a gear thereon that engages with a gear on said holder frame to swing said holder frame between said rest position and said working position in one direction of swinging movement of said lever and to swing said holder frame between said working position and said rest position in an opposite direction of swinging movement of said lever.

* * * * *